US010705293B2

(12) United States Patent
May et al.

(10) Patent No.: US 10,705,293 B2
(45) Date of Patent: Jul. 7, 2020

(54) SUBSTRATE INTEGRATED WAVEGUIDE

(71) Applicant: Intel Corporation, Santa Clara, CA (US)

(72) Inventors: Robert Alan May, Chandler, AZ (US); Kristof Darmawikarta, Chandler, AZ (US); Rahul Jain, Gilbert, AZ (US); Sri Ranga Sai Boyapati, Chandler, AZ (US); Maroun Moussallem, Phoenix, AZ (US); Rahul N. Manepalli, Chandler, AZ (US); Srinivas Pietambaram, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/061,540

(22) PCT Filed: Dec. 14, 2015

(86) PCT No.: PCT/US2015/065511
§ 371 (c)(1),
(2) Date: Jun. 12, 2018

(87) PCT Pub. No.: WO2017/105388
PCT Pub. Date: Jun. 22, 2017

(65) Prior Publication Data
US 2019/0250326 A1 Aug. 15, 2019

(51) Int. Cl.
*G02B 6/122* (2006.01)
*G02B 6/132* (2006.01)
(Continued)

(52) U.S. Cl.
CPC .............. *G02B 6/122* (2013.01); *G02B 6/132* (2013.01); *H01P 5/107* (2013.01); *G02B 6/134* (2013.01); *G02B 2006/12035* (2013.01)

(58) Field of Classification Search
CPC ...... G02B 6/0096; G02B 6/122; G02B 6/132; G02B 2006/12035; H01P 5/107
See application file for complete search history.

(56) References Cited

U.S. PATENT DOCUMENTS

| 4,652,083 A * | 3/1987 | Laakmann | G02B 6/032 385/125 |
| 4,688,892 A * | 8/1987 | Laakmann | G02B 6/102 385/125 |

(Continued)

FOREIGN PATENT DOCUMENTS

WO    WO-2017105388 A1    6/2017

OTHER PUBLICATIONS

"International Application Serial No. PCT/US2015/065511, International Search Report dated Jul. 29, 2016", 3 pgs.

(Continued)

*Primary Examiner* — Daniel Petkovsek
(74) *Attorney, Agent, or Firm* — Schwegman Lundberg & Woessner, P.A.

(57) ABSTRACT

This document discusses, among other things, a waveguide including a first metal having an outer surface proximate a dielectric material and an inner surface defining a path of the waveguide, a method of receiving an optical signal at the inner surface of the waveguide and transmitting the optical signal along at least a portion of the path of the waveguide. A method of integrating a waveguide in a substrate includes depositing sacrificial metal on a first surface of a carrier substrate to form a core of the waveguide, depositing a first metal over the sacrificial metal and at least a portion of the first surface of the carrier substrate, forming an outer surface of the waveguide and a conductor separate from the sacrificial metal, and depositing dielectric material over the first surface of the carrier substrate about the conductor.

16 Claims, 9 Drawing Sheets

(51) Int. Cl.
*H01P 5/107* (2006.01)
*G02B 6/134* (2006.01)
*G02B 6/12* (2006.01)

(56) References Cited

U.S. PATENT DOCUMENTS

| | | | | |
|---|---|---|---|---|
| 5,562,838 A * | 10/1996 | Wojnarowski | ... | B29D 11/00701 216/24 |
| 7,477,809 B1 * | 1/2009 | Tan | ... | G02B 6/13 385/125 |
| 7,496,264 B2 * | 2/2009 | Lee | ... | B82Y 20/00 385/129 |
| 7,583,882 B2 * | 9/2009 | Guo | ... | B82Y 20/00 359/332 |
| 7,844,142 B2 * | 11/2010 | Mouli | ... | G02B 6/43 385/129 |
| 8,906,670 B2 * | 12/2014 | Gray | ... | G01N 21/6452 435/287.2 |
| 9,405,063 B2 * | 8/2016 | Lai | ... | G02B 6/12002 |
| 9,405,065 B2 * | 8/2016 | Zhang | ... | G02B 6/136 |
| 2005/0089262 A1 * | 4/2005 | Jenkins | ... | G02B 6/122 385/14 |
| 2009/0058569 A1 | 3/2009 | Sherrer et al. | | |
| 2009/0190880 A1 * | 7/2009 | Hikita | ... | G02B 6/10 385/14 |
| 2011/0150385 A1 | 6/2011 | Kornilovich | | |
| 2011/0187482 A1 | 8/2011 | Ohno et al. | | |
| 2012/0195564 A1 | 8/2012 | Mathai et al. | | |
| 2013/0215495 A1 | 8/2013 | Thylen et al. | | |

OTHER PUBLICATIONS

"International Application Serial No. PCT/US2015/065511, Written Opinion dated Jul. 29, 2016", 5 pgs.

* cited by examiner

SUBSTRATE INTEGRATED WAVEGUIDE

CROSS-REFERENCE TO RELATED APPLICATION

This application is a U.S. National Stage Filing under 35 U.S.C. 371 from International Application No. PCT/US2015/065511, filed on Dec. 14, 2015, and published as WO 2017/105388, which application is incorporated herein by reference in its entirety.

TECHNICAL FIELD

This document relates generally to optical signal transmission and more particularly to substrate integrated waveguides for optical communication.

BACKGROUND

Optical communication uses light to carry information. In electronic systems, a transmitter, such as a light-emitting diode (LED) or one or more other light sources, can provide an optical signal to a detector, such as a photodiode. In various examples, the transmitter can provide the optical signal directly to the detector, or the optical signal can be transmitted between the transmitter and the detector using an optical interconnect, such as optical cables. Traditional optical interconnects have a higher bandwidth and lower loss than metal interconnects over large distances. However, metal interconnects can provide cost and performance benefits at smaller distances, at smaller scale, or where a high density of interconnects are required.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, waveguide systems, methods of transmitting optical signals using waveguide systems, and methods of manufacturing waveguide systems, for example, using substrate-manufacturing processes described herein, that provide, among other things, higher performance, decreased pitch (i.e., the distance between waveguides), increased density, and decreased cost in contrast to existing optical interconnects, as well as integration with electrical routing within or on a substrate.

FIGS. 1-12 illustrate generally example cross sections of a substrate-integrated hollow metal waveguide (HMW), such as first, second, and third hollow-metal waveguides 115A-C, formed in a substrate, for example, alongside electrical traces (e.g., a first electrical routing 108, etc.) in various stages of manufacture, as described herein. The following figures are illustrative, and other processing techniques or stages can be used in accordance with the subject matter described herein.

Hollow metal waveguides can provide faster signal propagation than copper- or glass-based fiber-optics and are capable of long-range transmission because they do not suffer resistance losses common to electrical signal transmission. The specific location and number of waveguides illustrated herein are illustrative, and not intended to limit the scope of the present subject matter.

A sacrificial metal template, such as a sacrificial nickel (Ni) template, can be formed on a substrate, forming a core of a waveguide. The first metal, such as copper (Cu), can then be deposited over the sacrificial metal. After the first metal is deposited, the sacrificial metal can be removed, leaving the first metal in place, forming a hollow channel of the waveguide. Nickel and copper are advantageous first and second metals because they are easily deposited, and each have selective etches to remove one metal while leaving the other. In other examples, the sacrificial metal and the first metal can be switched, or other metals can be used in accordance with these principles.

Using a process flow such as illustrated in FIGS. 1-12 herein, waveguides can be fabricated, on-substrate or off-substrate, having pitches of only a few microns. As the widths and pitches of the waveguides can be selected to maximize transmission efficiency, depending on the desired transmission wavelength, allowing smaller pitches and increased density can provide increased transmission efficiency and bandwidth in contrast to existing optical interconnects having larger minimum widths and pitches.

Figure 1:
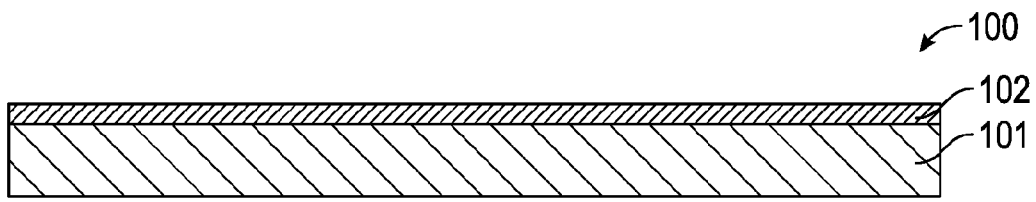
FIGS. 1-12 illustrate generally an example substrate-integrated hollow-metal waveguide.

FIG. 1 illustrates generally an example cross section of a system 100 including a carrier substrate 101, and a metal layer 102 on a top surface of the carrier substrate 101. The carrier substrate 101 can provide a flat and stable surface to facilitate tight design rules (e.g., 4 um pitch copper patterns, etc.) for one or more of the processes illustrated in FIGS. 2-6. The metal layer 102 can include a nickel (Ni) layer, or one or more other metal layers, the metal having a selective etch, such as copper (Cu), etc. The metal layer 102 can be laminated on the top surface the carrier substrate 101, plated, or otherwise deposited on the top surface of the carrier substrate 101.

In certain examples, the top surface of the carrier substrate 101 can include the metal layer 102, such that the carrier substrate 101, when the metal layer 102 is nickel, can be referred to as a nickel-clad carrier, or when the metal layer 102 is copper, can be referred to as a copper-clad carrier, etc.

Figure 2:
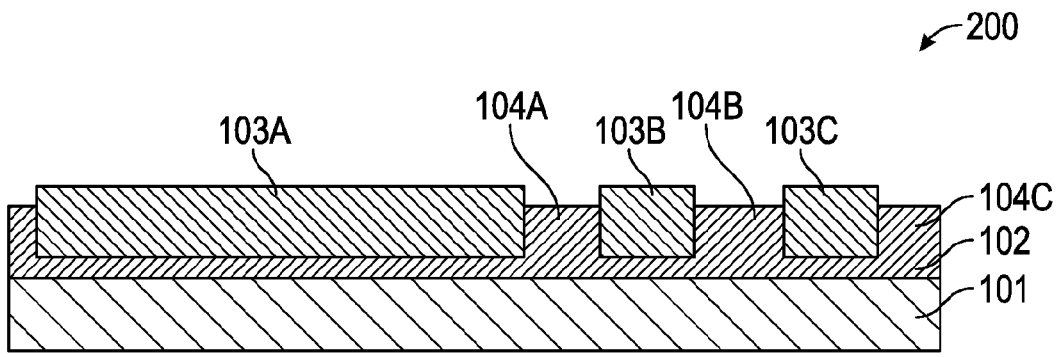

FIG. 2 illustrates generally an example cross section of a system 200 including dry film resist 103A-C and sacrificial metal 104A-C. The dry film resist 103A-C can be patterned (e.g., laminated, exposed, developed, etc.) on a top surface of the metal layer 102 to form a waveguide template, depending on the desired waveguide configuration. The sacrificial metal 104A-C can include the same metal as the metal layer 102, deposited on the top surface of the metal layer 102, about the waveguide template, forming one or more waveguide cores. FIG. 2 illustrates first and second waveguide cores (e.g., sacrificial metal 104A, 104B), and a portion of a third waveguide core (e.g., sacrificial metal 104C).

Depositing the sacrificial metal 104A-C can include electroplating sacrificial metal on a top surface of the carrier substrate 101 or the metal layer 102. The sacrificial metal 104A-C can include nickel, or one or more other metals having a selective etch, such as copper, etc. In other examples, the dry film resist 103A-C can include one or more other photoresist laminated or otherwise applied to and patterned on the top surface of the metal layer 102. After the sacrificial metal 104A-C is deposited, the dry film resist 103A-C can be removed (e.g., using developer, stripper, etc.).

Figure 3:
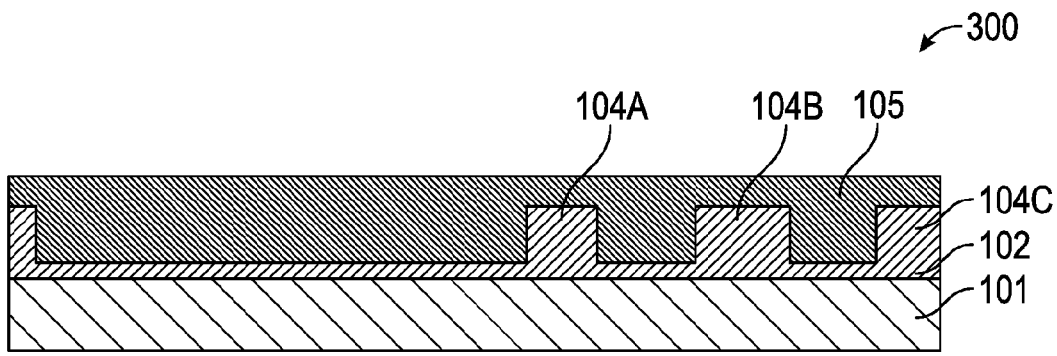

FIG. 3 illustrates generally an example cross section of a system 300 including a first metal 105 deposited over the sacrificial metal 104A-C and at least a portion of the top surface of the carrier substrate 101, or the top surface of the metal layer 102. The first metal 105 can include an inner surface disposed on the sacrificial metal 104A-C, and a lower surface disposed on the top surface of the carrier substrate 101, or the top surface of the metal layer 102. The first metal 105 can include copper or one or more other metals, and can be plated (e.g., panel plated), laminated, or otherwise deposited over the sacrificial metal 104A-C and at least a portion of the top surface of the carrier substrate 101, or the top surface of the metal layer 102.

Figure 4:
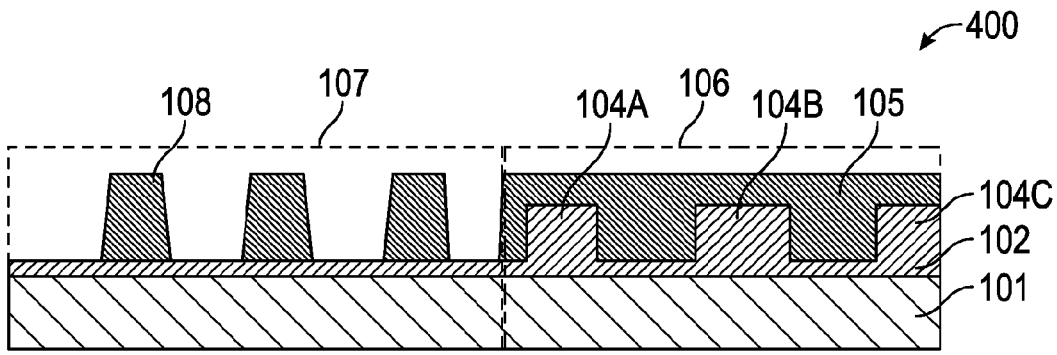

FIG. 4 illustrates generally an example cross section of a system 400 including a carrier substrate 101 having an optical routing portion 106 and an electrical routing portion 107. As illustrated, the optical routing portion 106 is being formed at right, and the electrical routing portion 107 at right. Once the optical routing portion 106 is completed, electrical routing can be formed above, below, or next to the optical routing portion 106. Further, the optical routing portion 106 and the electrical routing portion 107 can be formed in overlapping processing steps, such as illustrated herein, or otherwise.

At least a portion of the first metal 105 can be removed, forming an outer surface of a waveguide and a conductor separate from the sacrificial metal 104A-C and the metal layer 102. Photoresist, such as dry film resist, etc., can be placed over at least a portion of the first metal 105, and patterned to form an etching template, defining the outer surface of the waveguide and the conductor separate from the sacrificial metal 104A-C and the metal layer 102. Portions of the first metal 105 not protected can be etched down to the metal layer 102, leaving a first set of electrical routings in the electrical routing portion 107, such as a first electrical routing 108. The remaining photoresist can then be stripped, and the system 400 can be finished using one or more processing techniques (e.g., lamination, laser drilling, desmear, etc.). The remaining first metal 105 in the optical routing portion 106 can form the outer surface of the waveguide.

Figure 5:
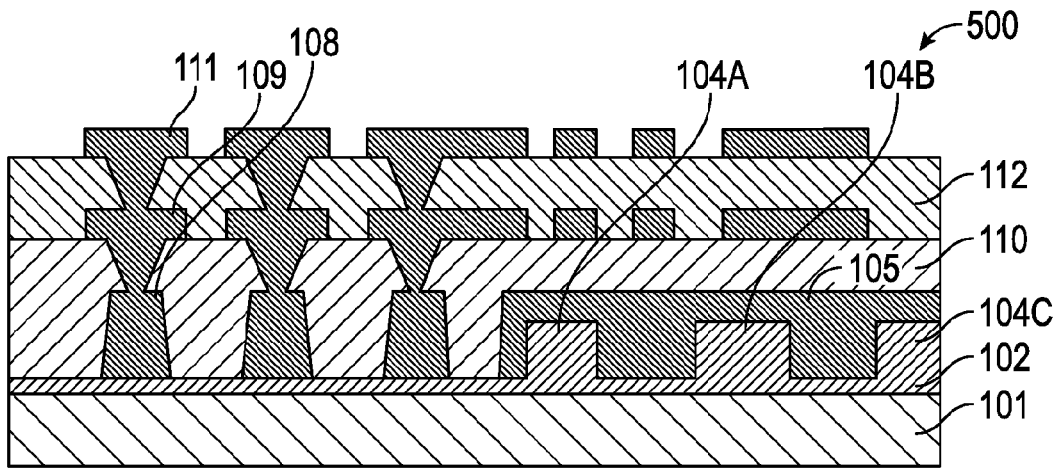

FIG. 5 illustrates generally an example cross section of a system 500 including the carrier substrate 101, the first metal 105 forming the outer surface of the waveguide, and the first electrical routing 108. In contrast to the system 400 illustrated in FIG. 4, the system 500 has been finished using one or more processing techniques. A first dielectric material 110 can be deposited over the outer surface of the first metal 105 and the top surface of the metal layer 102, covering the outer surface of the first metal 105 and the first set of electrical routings, including the first electrical routing 108.

A second set of electrical routings can be formed in and on the first dielectric layer 110, including a second electrical routing 109. A second dielectric material 112 can be deposited over the second set of electrical routings. A third set of electrical routings can be formed in and on the second dielectric layer, including a third electrical routing 111. The first, second, and third set of electrical routings, and the first and second dielectric material 110, 112, can be formed or finished using one or more processing techniques (e.g., lamination, laser drilling, desmear, etc.).

Figure 6:
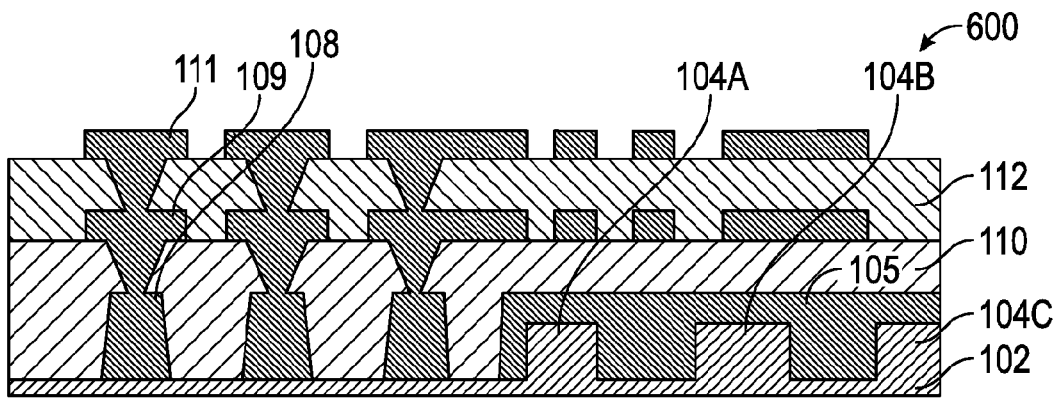

FIG. 6 illustrates generally an example cross section of a system 600 having the carrier substrate 101 removed.

Figure 7:
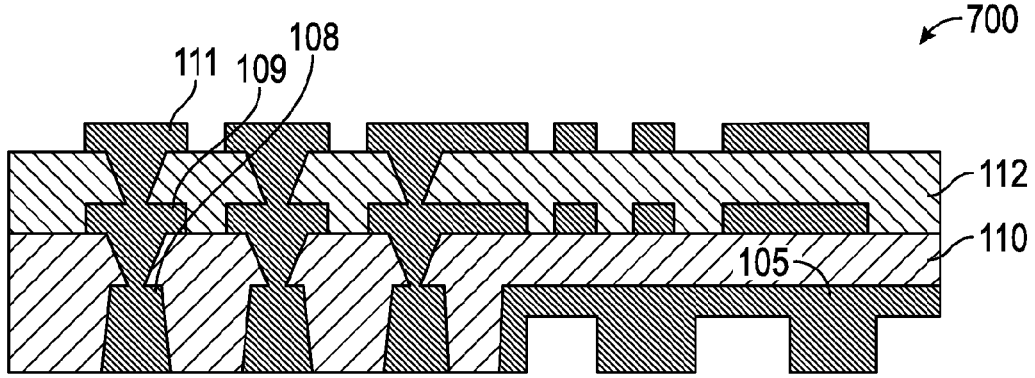

FIG. 7 illustrates generally an example cross section of a system 700 having the metal layer 102 and the sacrificial metal 104A-C removed, e.g., etched, etc. When removing the sacrificial metal 104A-C, the first metal 105 (e.g., copper) can provide an etch stop for the sacrificial metal 104A-C (e.g., nickel). Removing the metal layer 102 can electrically isolate the first metal 105 from the first set of electrical routings, including the first electrical routing 108. Removing the sacrificial metal layer 104A-C (i.e., first, second, and third waveguide cores) can expose an inner surface of the first metal 105 (i.e., an inner surface of the waveguide, specifically a top and two sides of each of first, second, and third waveguides, with the second side of the third waveguide absent from the cross section of FIG. 7).

Figure 8:
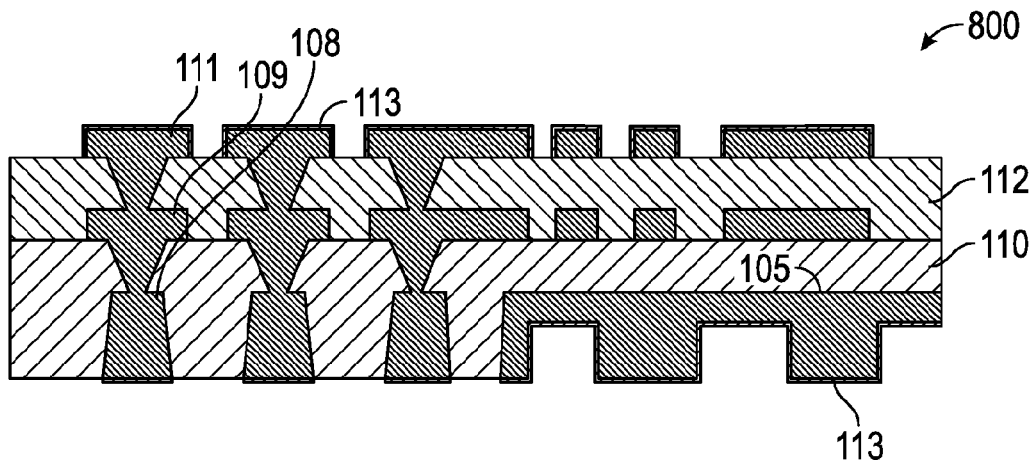

FIG. 8 illustrates generally an example cross section of a system 800 including a second metal 113 deposited on an inner surface of the first metal 105. The second metal 113 can also be deposited on a exposed bottom surfaces of the first set of electrical routings, such as an exposed bottom surface of the first electrical routing 108. The second metal 113 can include silver (Ag), or one or more other metals (e.g., tin (Sn), nickel (Ni), gold (Au), palladium (Pd), etc.) immersed or otherwise deposited on the first metal 105 or the first set of electrical contacts, depending on cost and performance considerations. For example, silver has a real refractive index less than 1 across the visible and into the near IR spectral regions. Because the inner core of the waveguides, once the sacrificial metal 104A-C is removed, has a refractive index of ~1 (i.e., air), depositing the second metal 113 with a refractive index similar to air can enable total internal reflectance across a wide wavelength range, and because attenuation is low, the waveguide can be compatible with a wide range of incoming wavelengths. The second metal 113 can include any number of metals, and in certain examples, can be omitted entirely, depending on desired waveguide performance, or the type of the first metal 105.

Figure 9:
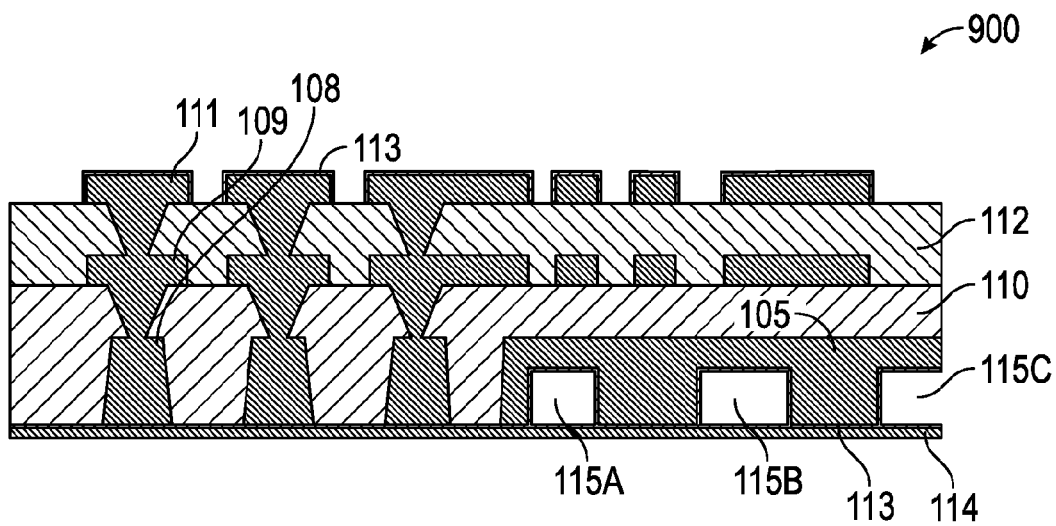

FIG. 9 illustrates generally an example cross section of a system 900 including a lower metal 114, coated with the second metal 113, laminated or otherwise disposed onto lower surfaces of the first dielectric material 110 and the second metal 113. The lower metal 114 can form a bottom of the waveguide, completing a hollow-metal waveguide, including first, second, and third hollow-metal waveguides 115A-C.

In other examples, if the second metal 113 is omitted from the lower surface of the first metal 105, or if the second metal 113 is not deposited on the lower surface of the first metal 105 (e.g., merely deposited on an inner surface of the waveguide, etc.), the lower metal 114 can be laminated or otherwise disposed onto a lower surface of the first metal 105.

The lower metal 114 can include copper, or one or more other metals, for example, depending on the first metal 105 or the second metal 113. In certain examples, adhesion concerns between hollow-metal waveguides can be addressed by spacing the hollow-metal waveguides so there is buildup material between them, adding a thin chemical adhesion promoter or using a wirebonder.

Figure 10:
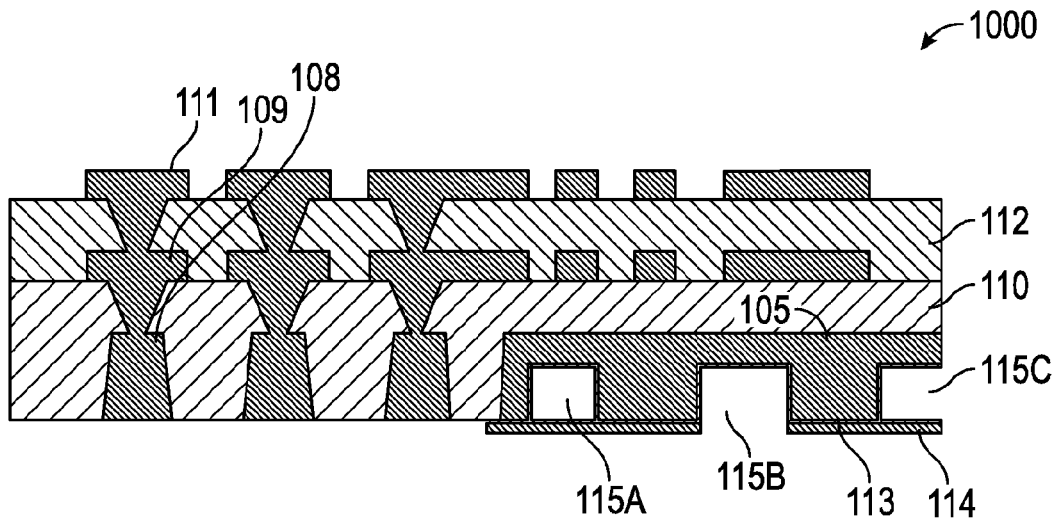

FIG. 10 illustrates generally an example cross section of a system 1000 having a portion of a hollow-metal waveguide open for coupling. In an example, a portion of the lower metal 114 and the second metal 113 can be removed, such as using a mask and etch, etc. The second metal 113 can act as an etch stop, preserving the form of the outer layer pads and traces. After etching the lower metal 114, the second metal 113 can be etched and the mask can be removed.

Figure 11:
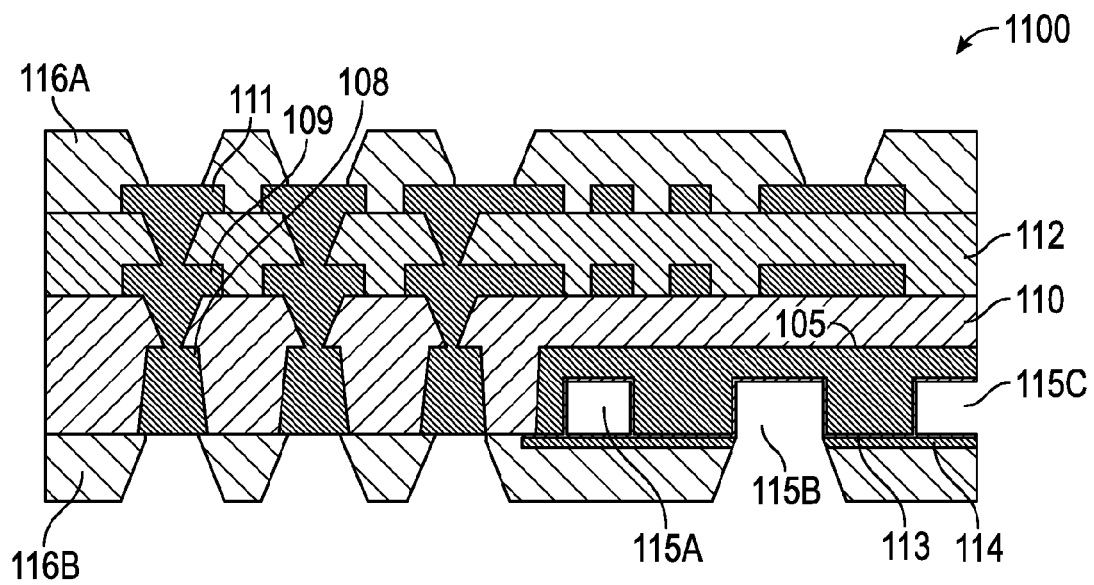

FIG. 11 illustrates generally an example cross section of a system 1100 including solder resist 116A-B. The solder resist 116A-B can be laminated, patterned, or otherwise disposed on top and bottom surfaces of the system 1100 to ensure compatibility with downstream processes.

Figure 12:
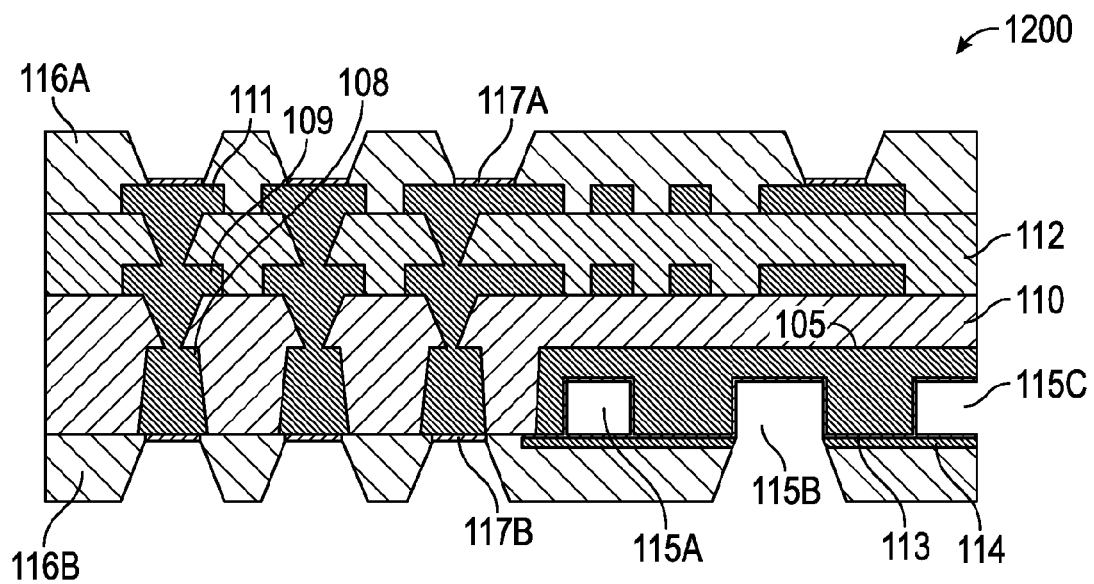

FIG. 12 illustrates generally an example cross section of a system 1200 including surface finish 117A-B. The surface finish 117A-B can be plated with a metal, such as nickel-palladium-gold (NiPdAu) or one or more other metals. In certain examples, the solder resist about the opening of the second hollow-metal waveguide 115B can be etched after applying surface finish 117A-B, such as using an ultraviolet (UV) laser, which can remove the solder resist without leaving significant amounts of residue.

The examples illustrated herein are advantageously compatible with existing semiconductor processing techniques, and can provide integrated electrical and optical routing in the same package, using similar processing techniques, at a lower cost than existing optical interconnects. Further, integrating hollow metal waveguides into existing substrates eliminates additional assembly steps required by existing optical interconnect integration, providing additional cost benefits.

Because the speed of light is inversely proportional to the refractive index, signal propagation in a hollow metal waveguide can be substantially faster (e.g., 30% or more) than in a fiber-optic cable or other substrate integration options that rely on optical transmission through dielectrics having higher refractive indices (e.g., 1.3, 1.4, etc.). Coating the inner surface of the hollow metal waveguide with silver (Ag) can enable total internal reflectance over a wide range of wavelengths (e.g., the real refractive index of silver is less than 1 for wavelengths ($\lambda$) between approximately 350 and 2500 nm), resulting in very low signal attenuation.

FIGS. 13-17 illustrate generally example cross sections of a waveguide formed using first and second materials having different refractive indices (e.g., "sandwich-like" configuration) in various stages of manufacture. The following figures are illustrative, and other processing techniques or stages can be used in accordance with the subject matter described herein.

In an example, low-refractive-index waveguides can be formed using materials with different refractive indices, and can be encapsulated with a reflector material to ensure total internal reflection, containing the signal within and transmitting the signal along at least a portion of the waveguide, depending on the design and desired transmission characteristics. In certain examples, waveguides can be fabricated directly on a substrate (e.g., proximate to, underneath, above, or directly next to electrical routing), or can be embedded in a cavity. Higher performances can be realized if the dielectric is lined with a metal.

A first dielectric material, such as a reflective over-mold, laminate, or dry process deposited material (e.g., silicon nitride (SiN) or silicon dioxide (SiO2), etc.) can be deposited on top of a carrier. In certain examples, a metal layer can optionally be disposed over the first dielectric material (e.g., using an electroless wet process, a dry sputtering or plasma-enhanced chemical-vapor deposition (PE-CVD) process, etc.) to improve performance of the resulting waveguide, for example, decreasing signal attenuation. A second dielectric material having a refractive index different (e.g., lower) than the first dielectric layer can be deposited over the metal layer, or over the first dielectric material if the metal layer is not present. In an example, the first dielectric material can include silicon dioxide, and the second dielectric material can include silicon nitride. In other examples, other first and second dielectric material, having different refractive indices, can be used, including special mold compounds, such as silicone epoxies that can be modified to have a high refractive index and a low refractive index.

The second dielectric material can be patterned, and portions of the second dielectric material can be removed, forming one or more waveguide cores using remaining second dielectric material. As above with respect to the first metal layer, a metal layer can optionally be disposed on the remaining second dielectric material. The first dielectric material can then be deposited over the remaining second dielectric material, or the metal layer over the remaining second dielectric material, completing one or more waveguides.

Figure 13:
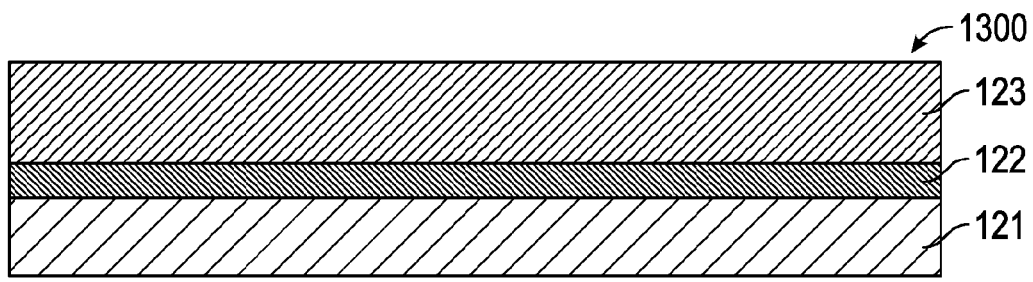
FIGS. 13-17 illustrate generally an example waveguide using first and second materials having different refractive indices.

FIG. 13 illustrates generally an example cross section of a system 1300 including a substrate 121, a first metal layer 122 (e.g., copper (Cu), etc.) disposed on the substrate 121, and a first dielectric material 123 disposed on a top surface of the first metal layer 122. In certain examples, the first metal layer 122 can be considered a part of the substrate 121, such that a top surface of the substrate 121 (e.g., a copper-clad substrate, copper foil, etc.) includes the top surface of the first metal layer 122.

Figure 14:
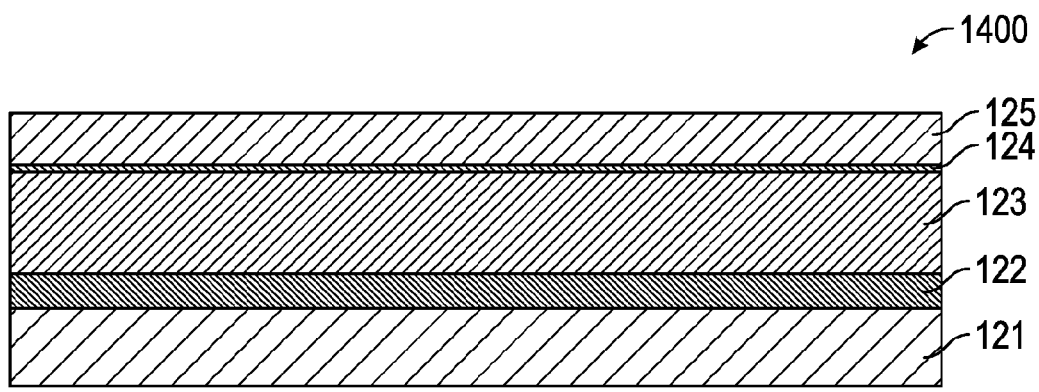

FIG. 14 illustrates generally an example cross section of a system 1400 including a reflective metal layer 124 (e.g., silver (Ag), tin (Sn), nickel (Ni), gold (Au), palladium (Pd), etc.) disposed on a top surface of the first dielectric material 123, and a second dielectric material 125 disposed on (e.g., over-molded, laminated, or otherwise deposited on) a top surface of the reflective metal layer 124. In certain examples, the reflective metal layer 124 is optional, and can be omitted.

Figure 15:
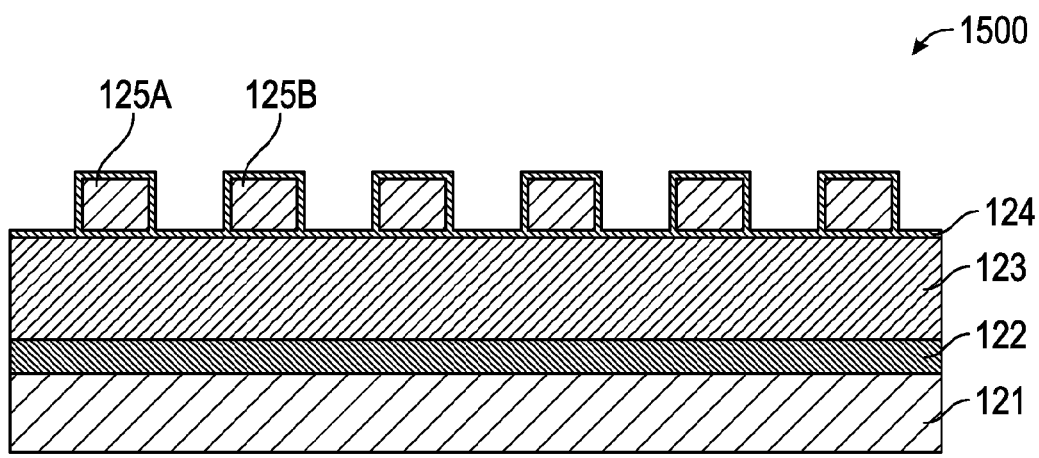

FIG. 15 illustrates generally an example cross section of a system 1500 including first and second waveguide sections 125A-B. The second dielectric material 125 can be patterned (e.g., using photoresist, etc.), portions of the second dielectric material 125 can be removed, remaining photoresist can be removed, and a metal can optionally be deposited over the remaining waveguide sections (e.g., the first and second waveguide sections 125A-B, etc.).

Figure 16:
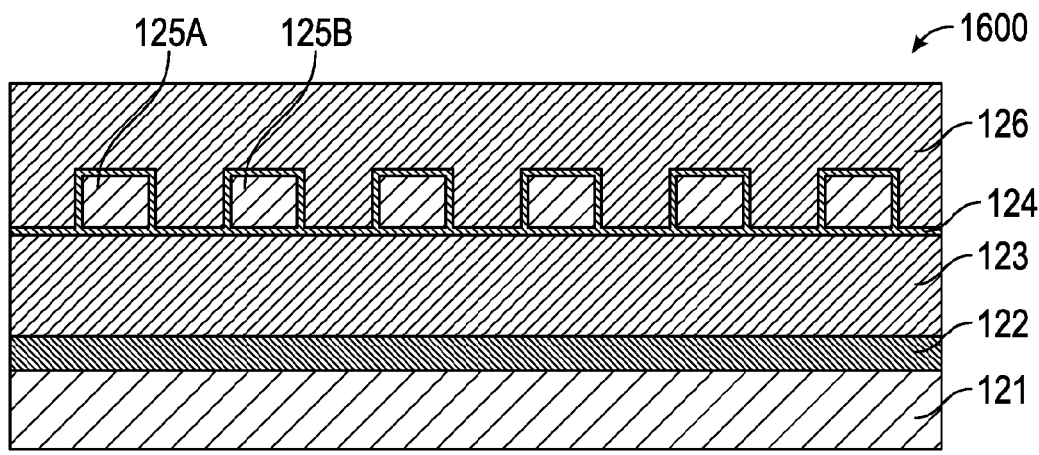

FIG. 16 illustrates generally an example cross section of a system 1600 including a third dielectric material 126 (e.g., the same material as the first dielectric material 123) disposed over (e.g., over-molded, laminated, or otherwise deposited over) the first and second waveguide sections 125A-B, and disposed over the exposed portions of the reflective metal layer 124 (or the first dielectric material 123 if the reflective metal layer 124 is omitted). Once covered by the third dielectric material 126 (e.g., the same material as the first dielectric material 123), the first and second waveguide sections 125A-B can form completed waveguides (e.g., with or without the optional reflective metal layer 124 surrounding the remaining second dielectric material 125). The substrate 121 and the first metal layer 122 can be removed (e.g., peeled, etched, etc.), leaving only the first and second waveguide sections 125A-B and surrounding dielectric material.

Figure 17:
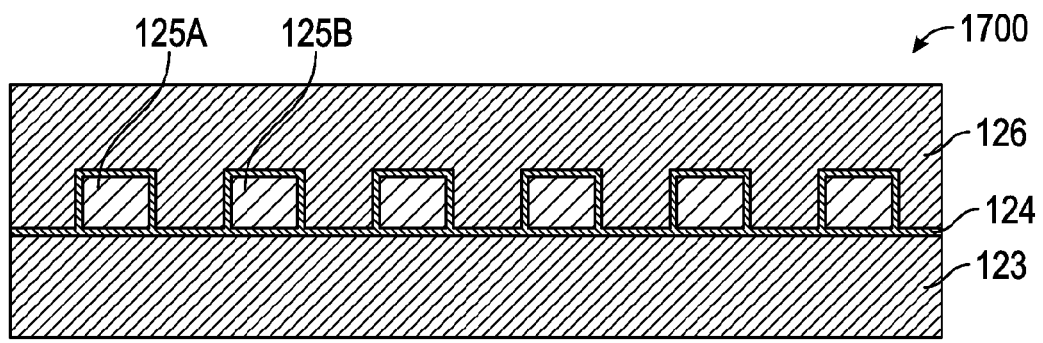

FIG. 17 illustrates generally an example cross section of a system 1700 including completed first and second waveguide sections 125A-B, encapsulated between the first and third dielectric materials 123, 126.

FIGS. 18-26 illustrate generally an example waveguide and grating structure (e.g., diffusion grating structure, etc.) formed using first, second, and third dielectric materials 134, 135, 138 on a patterned organic substrate 131. Efficiently coupling optical signals into waveguides is crucial to optical transmission using waveguides. The grating structure described herein can be used to efficiently couple an optical signal into a waveguide (e.g., greater than 60% efficiency, etc.). In combination with one or more other waveguide structures or processes, described herein, this grating structure can enable a total solution for integrating waveguides in substrates, with minimal processing cost (e.g., due to overlapping/shared processing techniques/steps, etc.). To optimize efficiency, the period and refractive index of the grating structure, described herein, can be tuned to an angle and frequency of an incoming optical signal.

Figure 18:
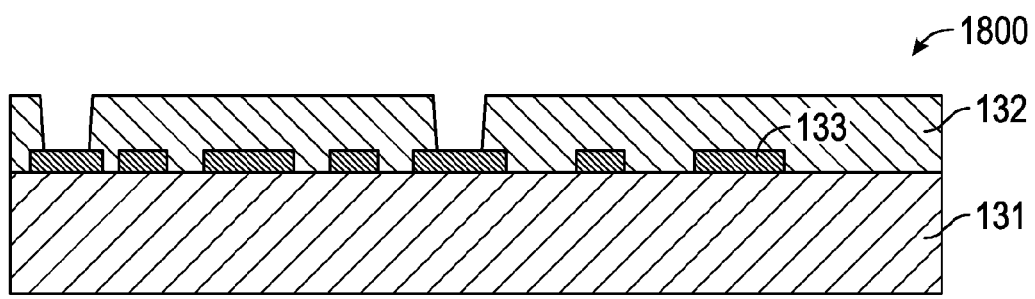
FIGS. 18-26 illustrate generally an example waveguide and grating structure.

FIG. 18 illustrates generally an example cross section of a system 1800 including a patterned organic substrate 131 (e.g., an organic substrate), including a build-up layer 132 (e.g., a dielectric layer, etc.) and one or more conductors (e.g., a first conductor 133, etc.). In an example, a layer of metal (e.g., a copper seed layer, etc.) can optionally be disposed on the build-up layer 132.

Figure 19:
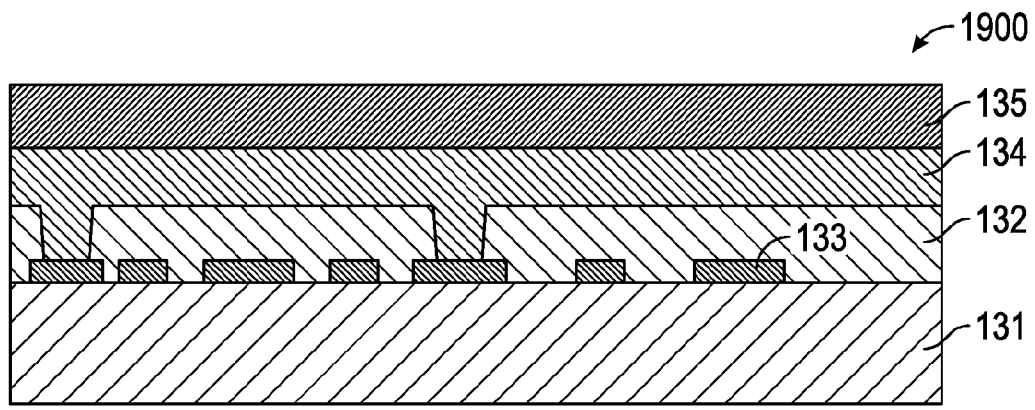

FIG. 19 illustrates generally an example cross section of a system 1900 including the patterned organic substrate 131, a first dielectric material 134 having a first refractive index deposited on a top surface of the patterned organic substrate 131 (e.g., including a copper seed layer), and a second dielectric material 135 having a second refractive index lower than the first refractive index deposited on the first dielectric material 134. In an example, the first dielectric material 134 can include silicon dioxide (SiO2), and the second dielectric material 135 can include silicon nitride (SiNx). In other examples, other dielectric materials, having different refractive indices, can be used, including special mold compounds, such as silicone epoxies that can be modified to have a high refractive index and a low refractive index, in accordance with the relationship described above, or otherwise.

Figure 20:
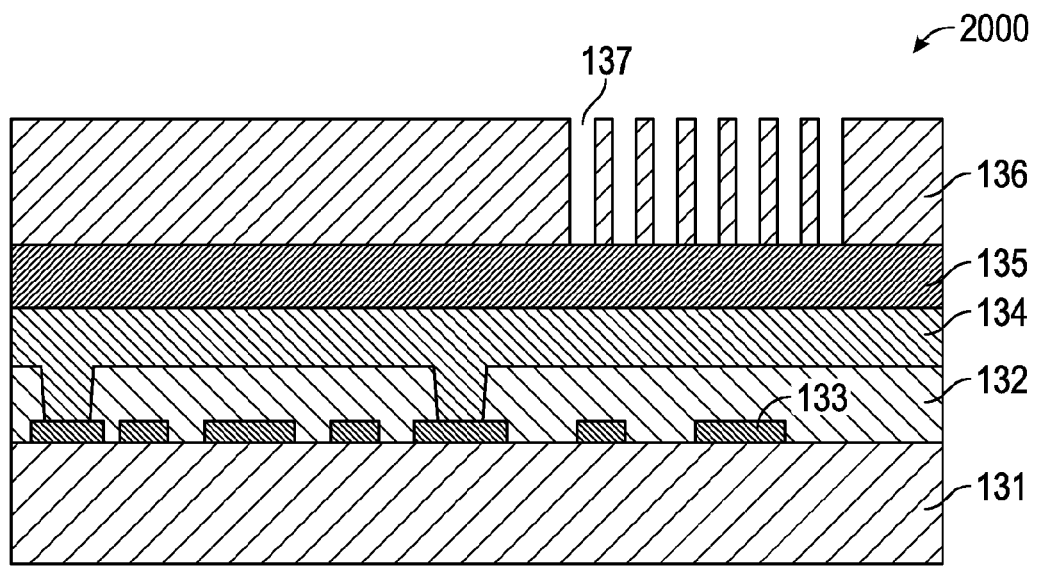

FIG. 20 illustrates generally an example cross section of a system 2000 including a first photoresist material 136 deposited (e.g., laminated, etc.) on the second dielectric material. The first photoresist material 136 can be exposed and developed, removing vertical sections of the first photoresist material 136, such as the first section 137, forming a grating template.

Figure 21:
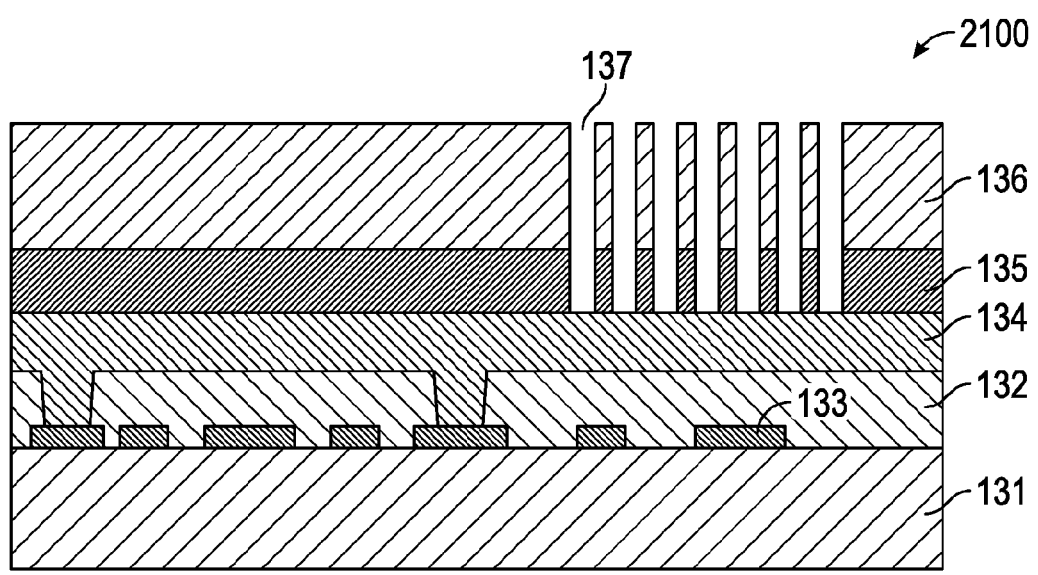

FIG. 21 illustrates generally an example cross section of a system 2100 including a grating structure in the second dielectric material 135. Sections of the second dielectric material 135 can be removed (e.g., plasma etched, etc.) under the removed vertical sections of the first photoresist material 136, such as the first section 137, down to a top surface of the first dielectric material 134. After the sections of the second dielectric material 135 is removed, the remaining first photoresist material 136 can be removed (e.g., stripped).

Figure 22:
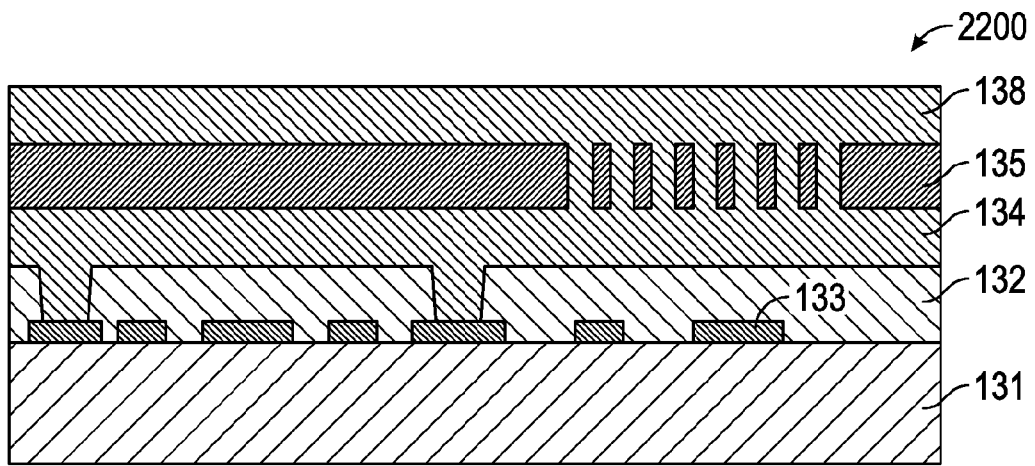

FIG. 22 illustrates generally an example cross section of a system 2200 including a third dielectric material 138 having a third refractive index higher than the second refractive index deposited in the removed sections of the second dielectric material 135, forming a grating structure having interleaving layers of the second and third dielectric material 135, 138 layered along a first plane. In an example, the third dielectric material 138 can be the same material as the first dielectric material 134 (e.g., SiO2).

The third dielectric material 138 can be deposited over a top surface of the second dielectric material 135 and over the grating structure, and the first, second, and third dielectric materials 134, 135, 138 can form a waveguide having interleaving layer, layered along a second plane different from the first plane and proximate to the gating structure.

In this example, the interleaving layers of the grating structure are orthogonal to the layers of the waveguide. In other examples, the angle between the interleaving layers of the grating structure and the layers of the waveguide can include one or more other angles. To optimize efficiency, the period, refractive index, angle, and widths of the first, second, and third dielectric materials 134, 135, 138 can be tuned to an angle and frequency of an incoming optical signal.

Figure 23:
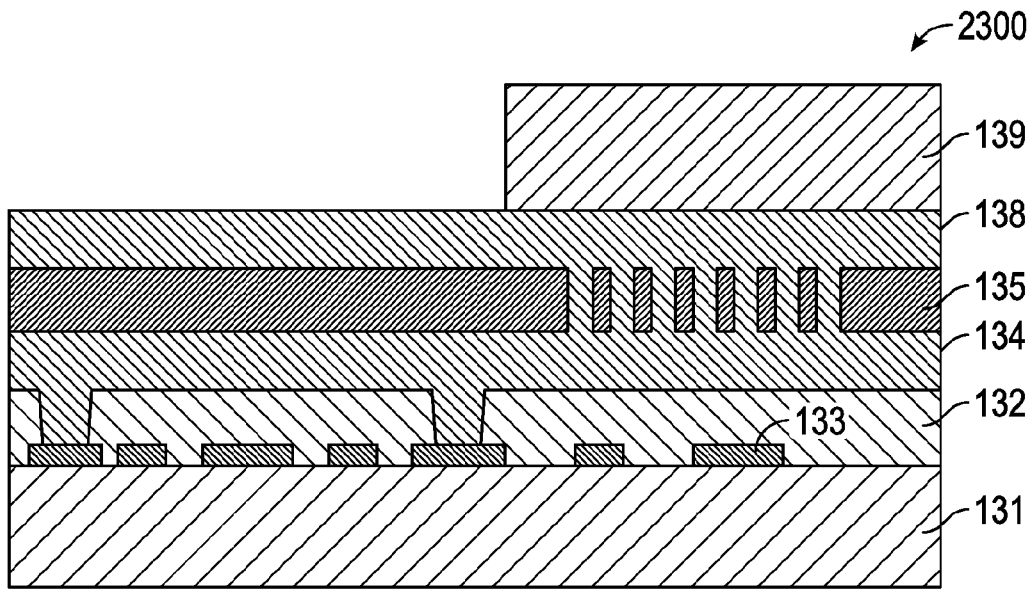

FIG. 23 illustrates generally an example cross section of a system 2300 including a second photoresist material 139 deposited (e.g., laminated) on a top surface of the third dielectric material 138. At least a portion of the second photoresist material 139 can be removed (e.g., exposed, developed, etc.), such as above an electrical area of the patterned organic substrate 131, leaving the second photoresist material 139 above the waveguide and grating structure area of the patterned organic substrate 131.

Figure 24:
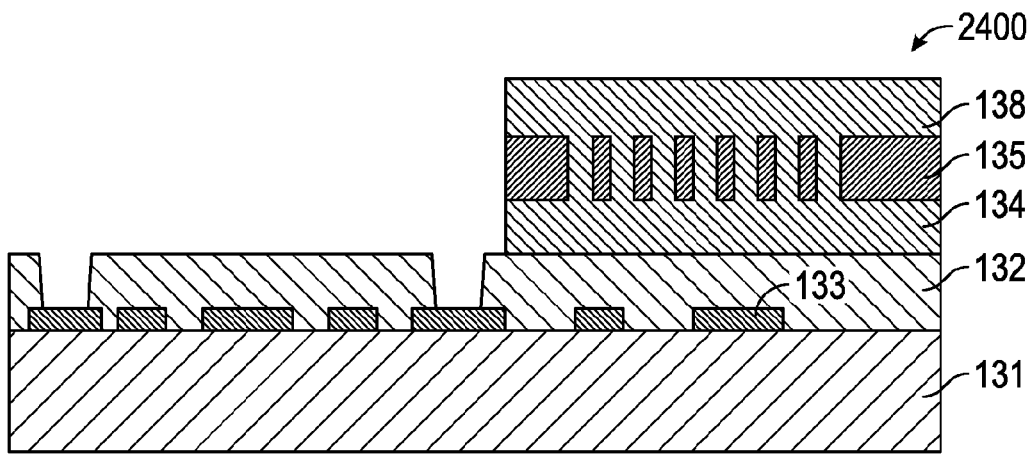

FIG. 24 illustrates generally an example cross section of a system 2400 including the waveguide and grating structure having the portions of the first, second, and third dielectric materials 134, 135, 138 over the electrical area of the patterned organic substrate 131, and the remaining second photoresist material 139, removed (e.g., etched, stripped, etc.).

Figure 25:
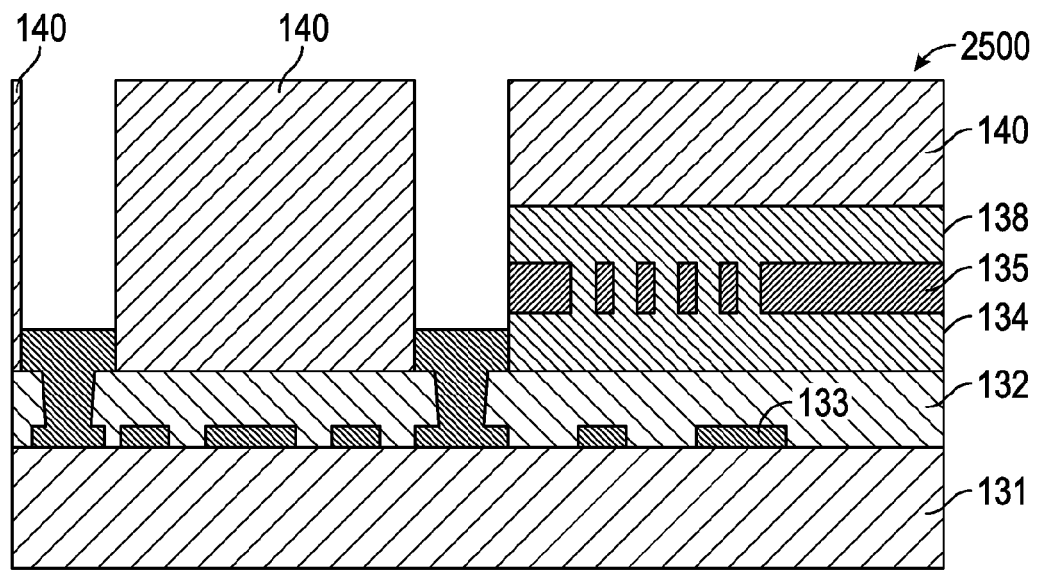

FIG. 25 illustrates generally an example cross section of a system 2500 including a third photoresist material 140. The third photoresist material 140 can be deposited (e.g., laminated) on a top surface of the build-up layer 132 and the third dielectric material 138. A portion of the third photoresist material 140 can be removed (e.g., exposed, developed, etc.), a metal (e.g., copper (Cu), etc.) can be deposited on one or more exposed conductors, and the third photoresist material 140 can be removed.

Figure 26:
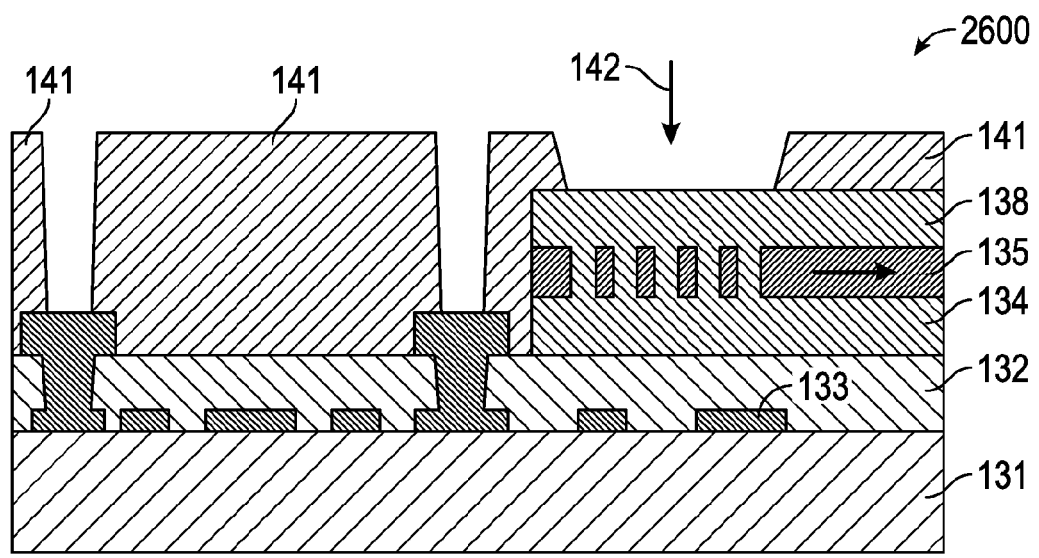

FIG. 26 illustrates generally an example cross section of a system 2600 including a solder mask material 141 deposited (e.g., laminated) over the waveguide and grating structure and the electrical area of the patterned organic substrate 131. A portion of the solder mask material 141 can be removed (e.g., exposed, developed, etc.), for example, over one or more conductors in the electrical area of the patterned organic substrate 131, or over the grating structure, forming an opening over the grating structure. In an example, an optical signal 142 can be received from a first direction, through the opening in the solder mask material 141, and through the layered grating structure from a first direction, into and along the waveguide in a second direction (e.g., along the arrows in FIG. 26).

In an example, the grating structure illustrated in FIGS. 18-26 can be incorporated over one or more of the waveguides disclosed in FIGS. 1-17 to couple an optical signal into the waveguide.

Additional Notes and Examples

In Example 1, a system includes a substrate including dielectric material, and a waveguide including a first metal having an outer surface and an inner surface, wherein at least a portion of the outer surface is proximate the dielectric material, wherein the inner surface defines a path, and wherein the waveguide is configured to receive an optical signal at the inner surface and to transmit the optical signal along at least a portion of the path.

In Example 2, the substrate of Example 1 optionally includes a conductor, separate from the waveguide, the conductor configured to transmit an electrical signal through the dielectric material.

In Example 3, the conductor of any one or more of Examples 1-2 is optionally the same metal as the first metal.

In Example 4, at least a portion of the conductor of any one or more of Examples 1-3 is optionally formed in the same process step as at least a portion of the first metal.

In Example 5, the waveguide of any one or more of Examples 1-4 is optionally a hollow metal waveguide including an input configured to receive the optical signal, a body configured to transmit the optical signal, and an output configured to output the transmitted optical signal, wherein a cross section of the body of the waveguide optionally includes a continuous inner surface.

In Example 6, the dielectric material and the waveguides of any one or more of Examples 1-5 are optionally formed in overlapping processing steps.

In Example 7, the outer surface of the first metal of any one or more of Examples 1-6 optionally includes orthogonal first and second faces, and the dielectric material is optionally disposed on the first face of the outer surface of the first metal or the second face of the outer surface of the first metal.

In Example 8, the dielectric material of any one or more of Examples 1-7 is optionally disposed on the first and second faces of the outer surface of the first metal.

In Example 9, a cross section of the outer surface of the first metal of any one or more of Examples 1-8 is optionally encapsulated in the dielectric material.

In Example 10, the waveguide of any one or more of Examples 1-9 optionally includes a second metal plated on the inner surface of the first metal, wherein the second metal is optionally configured to transmit the optical signal.

In Example 11, the first metal of any one or more of Examples 1-10 is optionally copper and the second metal is optionally silver.

In Example 12, a method includes receiving an optical signal at a waveguide, the waveguide including a first metal having an outer surface and an inner surface, wherein the inner surface defines a path, and transmitting the optical signal along at least a portion of the path, wherein at least a portion of the outer surface of the waveguide is proximate dielectric material of a substrate.

In Example 13, any one or more of Examples 1-12 optionally includes transmitting an electrical signal through the dielectric material using a conductor separate from the waveguide.

In Example 14, the conductor of any one or more of Examples 1-13 is optionally the same metal as the first metal, and at least a portion of the conductor is optionally formed in the same process step as at least a portion of the first metal.

In Example 15, any one or more of Examples 1-13 optionally includes receiving the optical signal at an input of the waveguide, transmitting the optical signal along a body of the waveguide, and outputting the optical signal at an output of the waveguide, wherein the waveguide is a hollow metal waveguide, and wherein a cross section of the body of the waveguide includes a continuous inner surface.

In Example 16, the dielectric material and the waveguide of any one or more of Examples 1-15 are optionally formed in overlapping processing steps.

In Example 17, the outer surface of the first metal of any one or more of Examples 1-16 optionally includes orthogonal first and second faces, wherein the dielectric material is optionally disposed on the first face of the outer surface of the first metal or the second face of the outer surface of the first metal.

In Example 18, the dielectric material of any one or more of Examples 1-17 is optionally disposed on the first and second faces of the outer surface of the first metal.

In Example 19, a cross section of the outer surface of the first metal of any one or more of Examples 1-18 is optionally encapsulated in the dielectric material.

In Example 20, the waveguide of any one or more of Examples 1-19 optionally includes a second metal plated on the inner surface of the first metal, wherein the second metal is optionally configured to transmit the optical signal.

In Example 21, the first metal of any one or more of Examples 1-20 is optionally copper and the second metal is optionally silver.

In Example 22, a method of integrating a waveguide in a substrate includes depositing sacrificial metal on a first surface of a carrier substrate to form a core of a waveguide, depositing a first metal over the sacrificial metal and at least a portion of the first surface of the carrier substrate, the first metal having an inner surface disposed on the sacrificial metal and a lower surface disposed on the first surface of the carrier substrate, removing at least a portion of the first metal from the first surface of the carrier substrate to form an outer surface of the waveguide and a conductor separate from the sacrificial metal, depositing dielectric material over the first surface of the carrier substrate about the conductor, the dielectric having a lower surface disposed on the first surface of the carrier substrate, and removing the carrier substrate and the sacrificial metal, such that the waveguide and the conductor are electrically isolated.

In Example 23, depositing the sacrificial metal of any one or more of Examples 1-22 optionally includes electroplating sacrificial metal on the first surface of the carrier substrate about a waveguide template to form the core of the waveguide, the depositing the first metal of any one or more of Examples 1-22 optionally includes plating or laminating the first metal over the sacrificial metal and at least a portion of the first surface of the carrier substrate, and removing at least a portion of the first metal from the first surface of the carrier substrate of any one or more of Examples 1-22 optionally includes etching at least a portion of the first metal from the first surface of the carrier substrate.

In Example 24, any one or more of Examples 1-23 optionally includes one or more of patterning the waveguide template on the first surface of the carrier substrate prior to electroplating the sacrificial metal on the first surface of the carrier substrate, removing the photoresist from the first surface of the carrier substrate about the sacrificial metal prior to plating the first metal over the sacrificial metal and at least a portion of the first surface of the carrier substrate, and patterning photoresist on the first metal to form an etching template defining the outer surface of the waveguide and the conductor separate from the sacrificial metal prior to etching at least a portion of the first metal to form the conductor.

In Example 25, patterning the waveguide template of any one or more of Examples 1-24 optionally includes patterning dry film resist on the first surface of the carrier substrate.

In Example 26, the sacrificial metal of any one or more of Examples 1-25 optionally defines the core of the waveguide, and plating the first metal optionally includes panel plating the first metal.

In Example 27, the sacrificial metal of any one or more of Examples 1-26 optionally includes nickel (Ni), the carrier substrate optionally includes a nickel-clad carrier substrate, and the first surface of the carrier substrate optionally includes a nickel layer on the carrier substrate.

In Example 28, removing the carrier substrate of any one or more of Examples 1-27 optionally includes removing the nickel layer on the carrier substrate.

In Example 29, any one or more of Examples 1-28 optionally includes, after removing the carrier substrate and the sacrificial metal, depositing a second metal on an inner surface of the first metal.

In Example 30, any one or more of Examples 1-29 optionally includes, after depositing the second metal on the inner surface of the first metal, laminating a lower metal onto the lower surfaces of the dielectric material and the first metal.

In Example 31, the lower metal of any one or more of Examples 1-30 optionally includes a copper sheet having an upper surface and a lower surface, and a silver layer having an upper surface and a lower surface, wherein the lower surface of the silver layer is optionally disposed on the upper surface of the copper sheet, and laminating the lower metal onto the lower surfaces optionally includes laminating the upper surface of the silver layer onto the lower surfaces of the dielectric material and the first metal.

In Example 32, a waveguide and grating structure system includes a substrate having electrical routing, a waveguide on the substrate, the waveguide configured to transmit at least a portion of an optical signal, the waveguide including layered first and second dielectric materials, the first dielectric material having a first index of refraction, and the second dielectric material having a second index of refraction different than the first index of refraction, and a grating structure configured to receive the optical signal and to couple at least a portion of the optical signal into the waveguide, the grating structure including interleaving layers of the first and second dielectric materials, the interleaving layers of the grating structure along a different plane than the layers of the waveguide.

In Example 33, the layers of the grating structure of any one or more of Examples 1-32 are optionally orthogonal to the layers of the waveguide.

In Example 34, the first dielectric material of any one or more of Examples 1-33 optionally includes silicon dioxide (SiO2), and the second dielectric material optionally includes silicon nitride (SiNx).

In Example 35, the waveguide of any one or more of Examples 1-34 optionally includes a first layer of the first dielectric material, a second layer of the second dielectric material on the first layer, and a third layer of the first dielectric material on the second layer.

In Example 36, any one or more of Examples 1-35 optionally includes a solder mask layer on the third layer of the waveguide about, but not over, at least a portion of the grating structure, the solder mask layer optionally defining an opening to the grating structure.

In Example 37, the grating structure of any one or more of Examples 1-36 is optionally between the first and third layers of the waveguide.

In Example 38, the grating structure of any one or more of Examples 1-37 is optionally configured to receive the optical signal from a first direction and to couple at least a portion of the optical signal into the waveguide along a second direction different than the first direction.

In Example 39, the first direction of any one or more of Examples 1-38 is optionally orthogonal to the second direction.

In Example 40, a method includes receiving at least a portion of an optical signal at a grating structure including interleaving layers of first and second dielectric materials, the first dielectric material having a first index of refraction, and the second dielectric material having a second index of refraction different than the first index of refraction, coupling at least a portion of the received optical signal into a waveguide, the waveguide including layered first and second dielectric materials, the layers of the waveguide along a different plane than the interleaving layers of the grating structure, and transmitting at least a portion of the coupled optical signal along the waveguide.

In Example 41, the layers of the grating structure of any one or more of Examples 1-40 are optionally orthogonal to the layers of the waveguide.

In Example 42, the first dielectric material of any one or more of Examples 1-41 optionally includes silicon dioxide (SiO2), and the second dielectric material optionally includes silicon nitride (SiNx).

In Example 43, the waveguide of any one or more of Examples 1-42 optionally includes a first layer of the first dielectric material, a second layer of the second dielectric material on the first layer, and a third layer of the first dielectric material on the second layer.

In Example 44, the waveguide of any one or more of Examples 1-43 optionally includes a solder mask layer on the third layer of the waveguide about, but not over, at least a portion of the grating structure, the solder mask layer optionally defining an opening to the grating structure.

In Example 45, the grating structure of any one or more of Examples 1-44 is optionally between the first and third layers of the waveguide.

In Example 46, receiving at least a portion of the optical signal of any one or more of Examples 1-45 optionally includes from a first direction, and transmitting at least a portion of the coupled optical signal optionally includes along a second direction different than the first direction.

In Example 47, the first direction of any one or more of Examples 1-46 is optionally orthogonal to the second direction.

In Example 48, a method includes depositing a first layer of a first dielectric material on a substrate, depositing a second layer of a second dielectric material on the first layer, removing first and second sections of the second layer, forming a template for a grating structure, depositing the first dielectric material in the first and second sections of the second layer, interleaving layers of the first and second dielectric material to form the grating structure, depositing a third layer of the first dielectric material on the second layer and the grating structure, wherein the first, second, and third layers form a waveguide, the layers of the waveguide along a different plane than the interleaving layers of the grating structure.

In Example 49, removing the first and second sections of the second layer of any one or more of Examples 1-48 optionally includes exposing a top surface of the first layer.

In Example 50, the interleaving layers of the grating structure of any one or more of Examples 1-49 are optionally orthogonal to the layers of the waveguide.

In Example 51, the first dielectric material of any one or more of Examples 1-50 optionally includes silicon dioxide (SiO2), and the second dielectric material optionally includes silicon nitride (SiNx).

In Example 52, any one or more of Examples 1-51 optionally includes depositing a solder mask layer on the third layer of the waveguide about, but not over, at least a portion of the grating structure, the solder mask layer optionally defining an opening to the grating structure.

In Example 53, a system or apparatus can include, or can optionally be combined with any portion or combination of any portions of any one or more of Examples 1-52 to include, means for performing any one or more of the functions of Examples 1-52, or a machine-readable medium including instructions that, when performed by a machine, cause the machine to perform any one or more of the functions of Examples 1-52.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An optical signal transmission system, comprising:
   a substrate including dielectric material; and
   a hollow metal waveguide including a first metal having an outer surface and an inner surface,
   wherein at least a portion of the outer surface of the first metal is proximate the dielectric material, wherein the inner surface of the first metal defines a path, and wherein the hollow metal waveguide is configured to receive an optical signal at the inner surface of the first metal and to transmit the optical signal along at least a portion of the path,
   wherein the substrate includes a conductor, separate from the hollow metal waveguide, the conductor configured to transmit an electrical signal through the dielectric material, and
   wherein the conductor is the same metal as the first metal.

2. The system of claim 1, wherein at least a portion of the conductor is formed in the same process step as at least a portion of the first metal.

3. The system of claim 1, wherein the hollow metal waveguide includes an input configured to receive the optical signal, a body configured to transmit the optical signal, and an output configured to output the transmitted optical signal, and
   wherein a cross section of the body of the hollow metal waveguide includes a continuous inner surface.

4. The system of claim 1, wherein the dielectric material and the hollow metal waveguide are formed in overlapping processing steps.

5. The system of claim 1, wherein the outer surface of the first metal includes orthogonal first and second faces, and wherein the dielectric material is disposed on the first face of the outer surface of the first metal or the second face of the outer surface of the first metal.

6. The system of claim 5, wherein the dielectric material is disposed on the first and second faces of the outer surface of the first metal.

7. The system of claim 5, wherein a cross section of the outer surface of the first metal is encapsulated in the dielectric material.

8. The system of claim 1, wherein the hollow metal waveguide includes a second metal plated on the inner surface of the first metal, wherein the second metal is configured to transmit the optical signal.

9. The system of claim 8, wherein the first metal is copper and the second metal is silver.

10. An optical signal transmission method, comprising:
receiving an optical signal at a hollow metal waveguide, the hollow metal waveguide including a first metal having an outer surface and an inner surface, wherein the inner surface of the first metal defines a path;
transmitting the optical signal along at least a portion of the path; and
transmitting an electrical signal through a dielectric material of a substrate using a conductor separate from the hollow metal waveguide,
wherein at least a portion of the outer surface of the first metal is proximate the dielectric material, and
wherein the conductor is the same metal as the first metal, and wherein at least a portion of the conductor is formed in the same process step as at least a portion of the first metal.

11. The method of claim 10, including:
receiving the optical signal at an input of the hollow metal waveguide;
transmitting the optical signal along a body of the hollow metal waveguide; and
outputting the optical signal at an output of the hollow metal waveguide,
wherein a cross section of the body of the hollow metal waveguide includes a continuous inner surface.

12. The method of claim 10, wherein the dielectric material and the hollow metal waveguide are formed in overlapping processing steps.

13. The method of claim 10, wherein the outer surface of the first metal includes orthogonal first and second faces, and wherein the dielectric material is disposed on the first face of the outer surface of the first metal or the second face of the outer surface of the first metal.

14. The method of claim 13, wherein the dielectric material is disposed on the first and second faces of the outer surface of the first metal.

15. The method of claim 13, wherein a cross section of the outer surface of the first metal is encapsulated in the dielectric material.

16. The method of claim 10, wherein the hollow metal waveguide includes a second metal plated on the inner surface of the first metal, wherein the second metal is configured to transmit the optical signal, and
wherein the first metal is copper and the second metal is silver.

* * * * *